United States Patent
Miller et al.

(10) Patent No.: US 9,817,102 B1
(45) Date of Patent: Nov. 14, 2017

(54) DE-WEIGHTING OF OUTLIER SIGNALS IN A RADIO FREQUENCY NAVIGATION SYSTEM

(71) Applicant: Apple Inc., Cupertino, CA (US)

(72) Inventors: Isaac Thomas Miller, El Granada, CA (US); Glenn Donald MacGougan, San Jose, CA (US); Kumar Gaurav Chhokra, San Jose, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 15/179,889

(22) Filed: Jun. 10, 2016

(51) Int. Cl.
*H04W 24/00* (2009.01)
*G01S 5/02* (2010.01)
*H04W 4/02* (2009.01)
*G01S 19/13* (2010.01)

(52) U.S. Cl.
CPC ............ *G01S 5/0263* (2013.01); *G01S 5/021* (2013.01); *G01S 19/13* (2013.01); *H04W 4/02* (2013.01)

(58) Field of Classification Search
USPC .......................................................... 455/456
See application file for complete search history.

(56) References Cited

U.S. PATENT DOCUMENTS

| 5,416,712 | A  | * | 5/1995 | Geier ................... G01C 21/165 342/357.3 |
| 6,362,782 | B1 | * | 3/2002 | Greenspan .............. G01S 19/22 342/357.61 |
| 8,639,640 | B1 | * | 1/2014 | Kadous .................. G01S 5/0252 342/451 |
| 8,825,397 | B2 |   | 9/2014 | Kasargod et al. |
| 2014/0125521 | A1 | * | 5/2014 | Monnerat ............... G01S 19/42 342/357.61 |
| 2017/0068001 | A1 | * | 3/2017 | Chhokra ................. G01S 19/40 |

FOREIGN PATENT DOCUMENTS

WO    WO 2015079260    4/2015

* cited by examiner

*Primary Examiner* — Kathy Wang-Hurst
*Assistant Examiner* — Said Elnoubi
(74) *Attorney, Agent, or Firm* — Fish & Richardson P.C.

(57) ABSTRACT

Methods, systems and computer program products for determining and filtering potential outliers in RF signals used in radionavigation are described. A radionavigation subsystem of a mobile device can determine a first location estimate of the mobile device. The mobile device can determine a free direction from the first location estimate. The free direction can be a direction along which RF signals may cause greater position errors than RF signals from other directions may cause. The mobile device can determine a potential outlier among the received RF signals, the potential outlier being an RF signal from a signal source in the free direction. The mobile device can indicate to the radionavigation subsystem that a weight of the potential outlier shall be reduced when determining a second location estimate of the mobile device using the RF signals.

20 Claims, 7 Drawing Sheets

DE-WEIGHTING OF OUTLIER SIGNALS IN A RADIO FREQUENCY NAVIGATION SYSTEM

TECHNICAL FIELD

This disclosure relates generally to location determination using radio frequency signals.

BACKGROUND

In radionavigation, a device can estimate a position using radio frequency (RF) signals. It can be difficult to compute an accurate position solution in challenging signal environments such as urban canyons, areas of dense foliage, and indoor environments. RF signals may interact with elements of these environments, resulting in effects such as multipath, signal reflection, and/or the like that may affect accuracy of position estimation. Conventional techniques for a radionavigation receiver can include identifying outlier signals and removing them from the navigation solution or decreasing their impact on the solution. These techniques are sometimes referred to as receiver autonomous integrity monitoring (RAIM), wherein the receiver uses some prior knowledge of its navigation solution and/or a redundant set of signal measurements to identify and handle outliers caused by interference. Conventionally, RAIM works well when there are a large number of signals available and a small number of outliers relative to the total number of signals.

SUMMARY

Techniques for determining and filtering potential outliers in RF signals used in radionavigation are described. A radionavigation subsystem of a mobile device can determine a first location estimate of the mobile device. The mobile device can determine one or more free directions from the first location estimate. Each free direction can include an azimuth along which RF signals may cause greater positioning errors than RF signals from other directions may cause. The mobile device can determine a potential outlier among the received RF signals, the potential outlier being a signal estimated to come from the free direction. The mobile device can indicate to the radionavigation subsystem that a weight of the potential outlier shall be reduced in estimating a final location of the mobile device using the RF signals.

The features described in this specification can achieve one or more advantages. For example, a mobile device implementing the techniques can reduce positioning errors in challenging RF signal environments including urban canyons and indoor environments. RAIM may fail when there are a significant number of outliers relative to the total signal count, since observed consistency in certain groups of signals is increasingly likely to be due to noise, and therefore meaningless. As the number of outliers increases, RAIM becomes increasingly likely to reject good signals due to random consistency amidst outliers. The technologies described in this specification improve over conventional RAIM technology by overcoming this problem. The technologies described in this specification can reject meaningless signals even when these meaningless signals form a majority of received RF signals. Accordingly, the technologies can improve accuracy in location estimation, particularly in challenging environments when outliers outnumber line-of-sight signals.

Even in an environment where RF interference with geographic structures is insignificant, the techniques disclosed in this specification can improve location estimation by determining directions that may be problematic and de-weight signal sources in those directions. For example, a running user may carry a navigation device in a forward-facing or backward-facing fanny pack. Signals from satellites on the opposite side of the user from the device can slow down speed estimates in a conventional navigation device. The techniques disclosed in this specification can improve over the conventional navigation device by de-weighting the signals of those satellites, thereby speed up location estimation, increase accuracy in location estimation, or both.

The techniques disclosed in this specification can improve location estimation where a directional, rather than an omni-directional, antenna is used in location estimation. In a directional antenna, signals from a particular direction may appear stronger than signals from other directions due to the physical structure and orientation of the antenna. The techniques disclosed in this specification can compensate for a directional antenna gain pattern so that RF signals are not favored merely because they arrive at a high-gain part of the antenna.

The details of one or more implementations of the disclosed subject matter are set forth in the accompanying drawings and the description below. Other features, aspects and advantages of the disclosed subject matter will become apparent from the description, the drawings and the claims.

BRIEF DESCRIPTION OF THE DRAWINGS

Like reference symbols in the various drawings indicate like elements.

DETAILED DESCRIPTION

Example Outlier Identification

Figure 1:
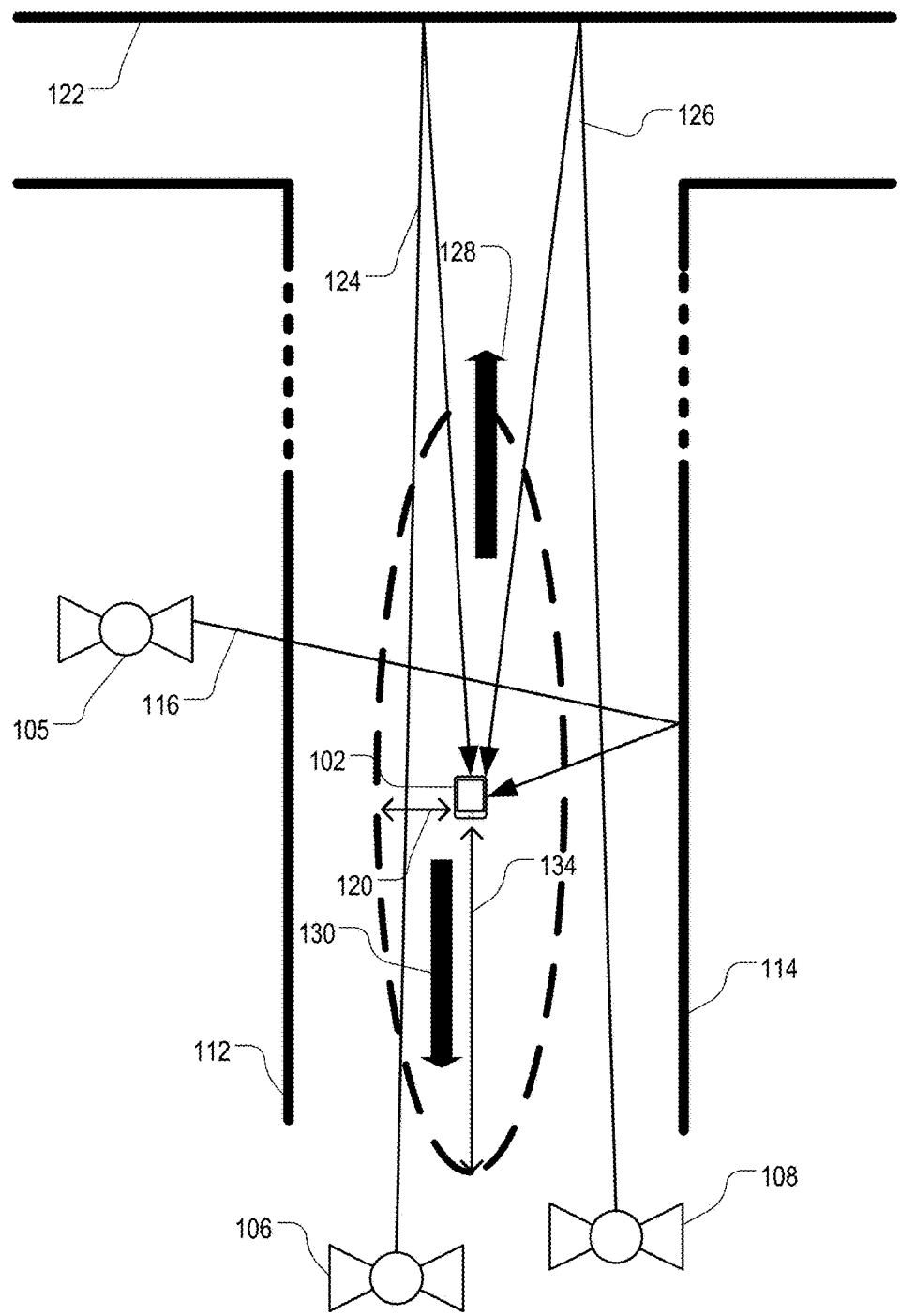
FIG. 1 is a diagram illustrating example techniques of identifying RF signals along certain azimuths as potential outliers.

FIG. 1 is a diagram illustrating example techniques of identifying RF signals along certain azimuths as potential outliers. Mobile device 102 is a device (e.g., a smartphone, smart watch or a navigation device) configured to estimate a position of mobile device 102 using radionavigation technologies. In particular, mobile device 102 can estimate its position using RF signals from one or more signal sources 105, 106 and 108. For simplicity, in the example shown, signal sources 105, 106 and 108 are satellites of a global navigation satellite system (GNSS). In various implementations, signal sources 105, 106 and 108 can be wireless access points (APs) of one or more wireless local area networks (WLANs), cellular towers, or other beacons that emit RF signals.

Various geographic features may interfere with the RF signals that mobile device 102 uses for navigation. In the example shown, mobile device 102 is in a dense urban environment, e.g., in a street lined with multi-story buildings. The buildings can have interfering surfaces 112 and 114. Interfering surfaces 112 and 114 can be walls that can reflect, diffuse, refract, diffract, or otherwise interfere with transmission of RF signals. In the example shown, signal 116 from signal source 105 reflects from interfering surface 114 before reaching mobile device 102. The reflection can cause range errors in a GNSS receiver, which, in turn, can cause positioning error 120. For positioning error 120, a distance between a location estimate in a position, velocity, and time (PVT) solution and a true location of mobile device 102 is X meters.

A building having interfering surface 122 can be located at an end of the street. In the example shown, interfering surface 122 can reflect RF signal 124 from signal source 106 and RF signal 126 from signal source 108. The distance between interfering surface 122 and mobile device 102 can be longer that the distance between interfering surface 114 and mobile device 102. Accordingly, the reflection path is longer for interfering surface 122. The range error can be more severe. Accordingly, the reflection can cause positioning error 134, in which a distance between a location estimate and a true location of mobile device 102 is Y meters. Due to the longer reflection path and more severe range error, positioning error 134 can be larger than positioning error 120 (Y>X).

Conventional navigation receivers may have filtering functions that can filter out outliers, when the majority of received signals are correct. In the situation shown, signals that cause positioning error 134, e.g., signals 124 and 126, can form a majority in the received signals. Accordingly, conventional navigation receivers may not be able to filter out signals 124 and 126.

Mobile device 102 is configured to correct or avoid the range errors caused by signals 124 and 126, even if signals 124 and 126 form a majority of received RF signals. Mobile device 102 can determine one or more free directions. A free direction can be a direction where interfering surfaces are likely to cause greater range error than interfering surfaces (if any) in other directions. For example, in a dense urban environment, a free direction can be a direction where an interfering surface is sufficiently far away from mobile device 102 such that signal interaction effects caused by this interfering surface tend to cause greater positioning error than other interfering surfaces may cause. Mobile device 102 can then determine an azimuth, and optionally an elevation, along each free direction. Mobile device 102 can designate signals that come from signal sources in the free directions as potential outliers (or simply referred to as outliers). Mobile device 102 can designate the signals that may cause greater range errors as outliers even if mobile device 102 receives a sufficient number of these signals, such that they are not "outliers" in a statistical sense. Mobile device 102 can instruct a radionavigation subsystem to reduce weights of the outliers in determining at least a portion of a PVT solution. For convenience, in this specification, a location estimate and a PVT solution are used interchangeably, where a "location estimate" can include an estimation in position, velocity, altitude, time, or any combination of the above.

Mobile device 102 can determine free directions using various techniques. For example, mobile device 102 can determine free directions based on movement of mobile device 102, based on geographic feature data, based on received signal strength (RSSI) and angle of arrival, based on sensor signals received on the device, or based on any combination of the above. Additional details and examples on determining free directions are described in reference to FIG. 2 and FIG. 3. For example, mobile device 102 can determine, based on movement of mobile device 102, that directions 128 and 130 are free directions. Each free direction can include an azimuth component, and optionally, an elevation component. Each component of the free direction can be measured in angles, e.g., number of degrees from North and horizon, respectively. Other reference frames are possible.

Mobile device 102 can determine, based on a time and a constellation map identifying locations of signal sources used in radionavigation, that signal sources 106 and 108 are within a threshold distance from the free direction. The threshold distance can be an angular distance, e.g., X degrees, and is referred to as cone width in detailed discussion below. Accordingly, mobile device 102 can designate signal 124 from signal sources 106 and signal 126 from signal source 108 as outliers. Mobile device 102 can de-weight these outliers in a location estimation.

For example, when signal sources 106 and 108 are GNSS satellites, mobile device 102 can request a GNSS receiver of mobile device 102 to ignore signal sources 106 and 108, or to reduce the weights of signal sources 106 and 108 in determining a PVT solution of mobile device 102. Mobile device 102 can submit the request through an interface of the GNSS receiver based on a specification of an application programming interface (API). As a result, range errors caused by interfering surface 122 can be eliminated in the location estimation. Accordingly, mobile device 102 can reduce or eliminate positioning error 134.

Figure 2:
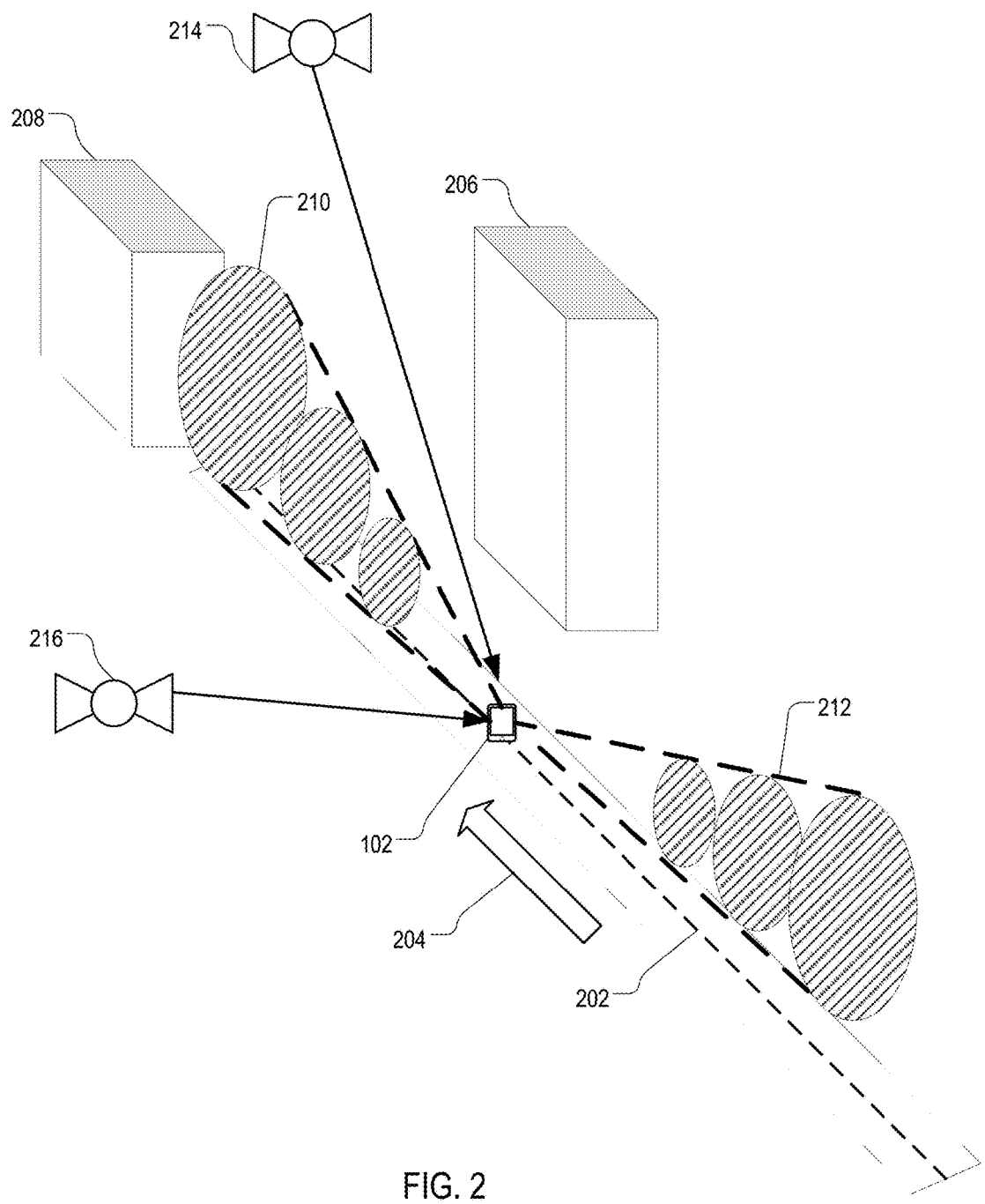
FIG. 2 is a diagram illustrating example techniques of azimuthal outlier detection based on moving direction.

FIG. 2 is a diagram illustrating example techniques of azimuthal outlier detection based on moving direction. Mobile device 102 can determine free directions based on movement of mobile device 102, and determine outliers according to azimuths of the free directions. Azimuthal outlier detection based on moving direction can be particularly effective in environments where, in each azimuth, there is likely to be an interfering surface that may interfere with RF signal reception. Examples of such environments include dense urban environments or urban canyons.

Mobile device 102 can determine a first location estimate (also referred to as an initial location estimate) of mobile device 102, using various technologies. Mobile device 102 can query a geographic feature database on mobile device 102 or on a server using the first location estimate to determine whether the first location estimate is in an environment where an interfering surface is likely to be encountered in all azimuths. For example, a response to the query can indicate that the first location is in an environment designated as marine (where there are few interfering surfaces except the water), rural (isolated and ignorable interfering surfaces), urban (some interfering surfaces), dense urban (where an interfering surface is likely to be encountered in any azimuth), or urban canyon (where an interfering surface is certain to be encountered in any azimuth). Upon determining that the first location estimate is in an environment where an interfering surface is likely to be encountered in all azimuths (e.g., dense urban or urban canyon environments), and upon determining that mobile device 102 is moving, mobile device 102 can perform azimuthal outlier detection based on the moving direction of mobile device 102. The moving direction is an azimuth along which mobile device 102 moves, where mobile device 102 is designated as an observer.

Mobile device 102 can determine the moving direction using various technologies, e.g., by using a motion sensor, compass, or GNSS receiver. Mobile device 102 can determine that, along (or against) the azimuth of the movement, interfering surfaces can be farther away from mobile device 102 than interfering surfaces that are perpendicular to the direction are. For example, mobile device 102 can determine that, in a dense urban environment, people walking in streets carrying mobile device 102 are more likely to walk along a street rather into a building.

In the example shown, mobile device 102 can determine, based on data from a geographic feature database, that mobile device 102 is in a dense urban area where reflections tend to cause positioning errors. Mobile device 102 can determine that mobile device 102 is moving in street 202 in direction 204. Mobile device 102 can determine that buildings, if any, on sides of street 202 (e.g., building 206) are likely to be located closer to mobile device 102 than buildings, if any, along (or against) direction 204 (e.g., building 208) are. Mobile device 102 can determine that a direction along direction 204 is a free direction. Likewise, mobile device 102 can determine that a direction against direction 204 is a free direction.

Mobile device 102 can determine cones 210 and 212, each corresponding to a respective free direction. Each of cones 210 and 212 can have a width and optionally, an elevation above the horizon, both measured in angles (e.g., 15 degree by 20 degree) measured from the cone's vertex. Mobile device 102 can designate a first location estimate of mobile device 102 as a respective vertex of cones 210 and 212. Mobile device 102 can determine the first location estimate using various technologies, e.g., by using Wi-Fi signals, cellular signals, GNSS signals, or dead reckoning. The elevation of the cone can be measured from the horizon. The width of the cone can be centered on the azimuth of the free direction, e.g., direction 204 or direction 204 plus (or minus) 180 degrees. Sections of the cone need not be a circle or an ellipse as shown in FIG. 2. For example, sections of the cone can be rectangles or squares, or a triangle or trapezoid on a spherical surface.

Mobile device 102 can determine the elevation and width using preset data, using empirical data, or derived based on region-specific data. In some implementations, the elevation can be preset to 90 degrees, extending from the horizon to the zenith. The elevation can be preset to a tolerance distance (e.g., 10 degrees) less than 90 degrees. For example, the elevation can be set to 80 degrees to recognize the fact that satellites almost directly overhead (by being less than the threshold degrees from the zenith) are unlikely to cause severe range error. Mobile device 102 can then de-weight satellite signals based on azimuth only or primarily based on azimuth. Different environments can have different tolerance distances, where a relatively denser environment (e.g., an urban canyon, compared to dense urban) corresponds to a relatively smaller (e.g., 10 degrees vs. 30 degrees) tolerance distance.

In some implementations, empirical data can indicate that signals reflected from interfering surfaces that are X meters away and having a surface height of Y meters cause the most position error. Mobile device 102 (or another device) can determine a cone elevation that can filter out signal sources that may reflect from these interfering surfaces. In this case, mobile device 102 can de-weight satellite signals based on azimuth as well as on structure heights as indicated in geographic feature data.

For example, geographic feature data may indicate that the first estimated location is in an area where a tallest geographic feature having an interfering surface (e.g., a tallest building) is 100 meters tall. Mobile device 102 can determine, based on an input or on preset data, that a threshold distance for determining a free direction (distance between mobile device 102 and a reflection surface sufficient to cause severe range error) is also 100 meters. The threshold distance is a distance to mobile device 102 above which an interfering surface can cause a range error or a positioning error that is above a given level (e.g., a positioning error of 50 meters). Mobile device 102 can then determine the cone elevation using Equation [1]:

$$\text{elevation} = \tan^{-1} \frac{\text{height of tallest feature}}{\text{threshold distance}}. \quad [1]$$

In this example, the result is 45 degrees. The width can be an angular width centered at the azimuth of the free direction. Mobile device 102 can determine the width using a preset value (e.g., 10 degrees). Alternatively, mobile device 102 can determine the width based on an average street width as indicated in the geographic feature data and based on the threshold distance, using calculations similar to those describe above.

In some implementations, mobile device 102 can identify signal sources that may cause range errors based on a constellation of the signal sources. In the example shown, the signal sources are GNSS satellites including satellites 214 and 216. Mobile device 102 can determine a constellation of the GNSS satellites, given a time. The constellation can include, for example, GPS, GLONASS, Galileo or Beidou satellites. A constellation map can include their respective locations in the space. Based on the locations, mobile device 102 can determine which GNSS satellites in the constellation are visible at the first location estimate at the given time, notwithstanding geographic features or reflective services. Mobile device 102 can determine viewing angles of each visible satellite including azimuth and elevation. Based on the azimuth and elevation of the satellites, mobile device 102 can determine whether a section of a signal path of signals from a satellite to mobile device 102 is enclosed in cone 210 or cone 212. If yes, mobile device 102 can designate signals of that satellite as a potential outlier.

In some implementations, mobile device 102 can determine that signals that have the largest Doppler shift are potential outliers. Mobile device 102 can determine that signals having the largest Doppler shift are more likely to be signals reflected by a surface in the free direction or opposite the free direction, and therefore are likely to cause range errors. In some implementations, mobile device 102 can combine the direction of signal source or the Doppler shifts with RSSI. Mobile device 102 can determine that an RSSI above a given level may indicate that a signal is a line-of-sight signal and therefore not a potential outlier. Mobile device 102 can determine that an RSSI that is X dBm below the given level is likely to be an affected signal. Combining the likelihood with the Doppler shift, signal source location in the constellation, or both, mobile device 102 can determine a likelihood that a signal is a potential outlier and de-weight that potential outlier accordingly.

In some implementations, mobile device 102 can determine a free direction based on RSSI. A user can carry mobile device 102, e.g., in a fanny pack in the front or in the back, while moving. RF signals from some satellites will be attenuated by the user's body. Mobile device 102 can designate a direction of satellites the signals of which are below a threshold value as the free direction. Thus, even if a satellite in that direction has a strong signal, mobile device 102 may still designate that strong signal as an outlier.

Figure 3:
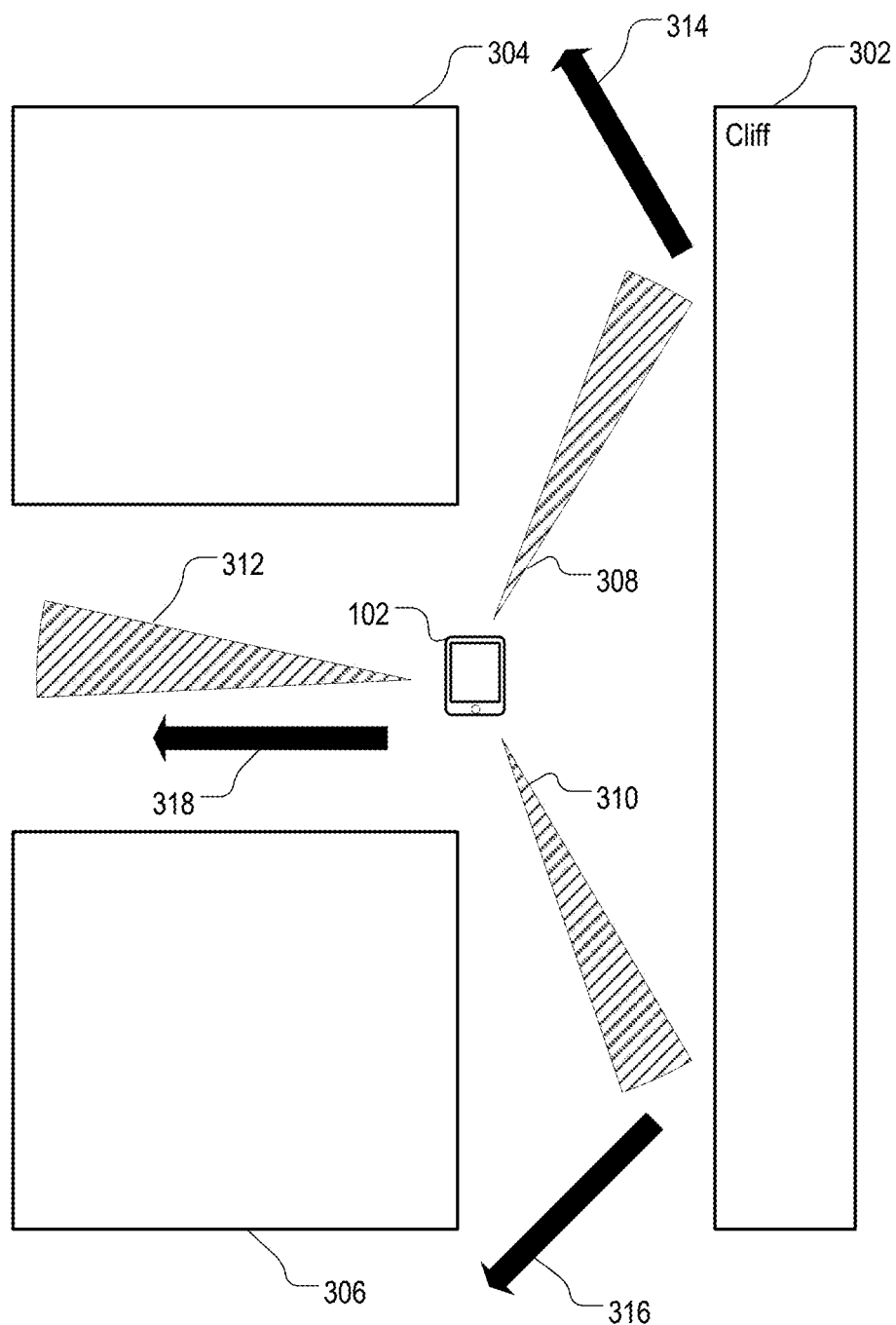
FIG. 3 is a diagram illustrating example techniques of azimuthal outlier detection based on geographic feature data.

FIG. 3 is a diagram illustrating example techniques of azimuthal outlier detection based on geographic feature data. Mobile device 102 receives, from a location subsystem of mobile device 102, a first location estimate of mobile device 102. Mobile device 102 can receive, from a local cache or a remote server, geographic feature data. The geographic feature data can include one or more three-dimensional (3D) building models, one or more terrain maps indicating cliffs, canyons, valleys or other features that may affect RF signal reception, or in case of indoor navigation, one or more indoor maps indicating a floor plan. For simplicity, in the example shown, mobile device 102 can determine free directions using 3D building models. Techniques using other geographic feature data can be similar.

Each 3D building model can represent features of artificial or natural structures that may reflect signals reaching the first location estimate. The structures can be buildings, bridges, cliffs or other structures having interfering surfaces. The features can include locations, shapes, width, orientation and heights of the interfering surface. In the example shown, mobile device 102 can determine that, according to the 3D building model, the first location estimate of mobile device 102 is under cliff 302, on a road between building 304 and building 306.

Mobile device 102 can determine one or more azimuths to interfering surfaces that are sufficiently far (e.g., more than X meters) away from the initial location, that reflections from these surfaces can cause a positioning error that is above a threshold level (e.g., an error of 50 meters, severe enough to put the device in the wrong street or on a wrong side of a river). In the example shown, based on streets represented in the 3D building model, mobile device 102 can determine azimuths 308, 310, and 312 are such azimuths. Mobile device 102 can then determine one or more free directions based on azimuths 308, 310 and 312 using various techniques for tracing signal paths among interfering surfaces, e.g., ray tracing, to signal sources (e.g., satellites). Mobile device 102 can designate signals from signal sources in the free directions as potential outliers.

In the example shown, mobile device 102 can determine free directions 314, 316 and 318 based on ray tracing. Mobile device 102 can then determine cones along the free directions 314, 316 and 318 using the techniques described above in reference to FIG. 2, including determining widths around the azimuths of the free directions and optional elevations. Mobile device 102 can de-weight the signals of those signal sources in the cones (e.g., navigation satellites in the cone).

De-weighting the signals can include, for example, indicating the weight of these signal sources to a GNSS receiver, or increasing an error (e.g., by scaling the error by a factor of X) in a statistical filter (e.g., a Kalman filter) that determines a PVT solution using the signals. Mobile device 102 can determine the factor X based on empirical data. For example, mobile device 100 can use a larger value (e.g., 10) in an environment designated as dense urban and a smaller value (e.g., 2) in an environment designated as normal urban.

In some implementations, de-weighting the signals can include changing an order of signal sources in a list in a location estimator where signal sources listed earlier have higher importance in determining a PVT solution than signal sources listed later. Mobile device 102 applies a multi-pass process to signal sources of detected signals. In a first pass, mobile device 102 can put signal sources not in the cone in the list according to their elevation, where higher elevation corresponds to a position closer to the beginning or top of the list In a second pass, mobile device 102 put the signal sources in the cone at the end or bottom of the list, also in order of the elevation.

Example Components for Azimuthal De-weighting

Figure 4:
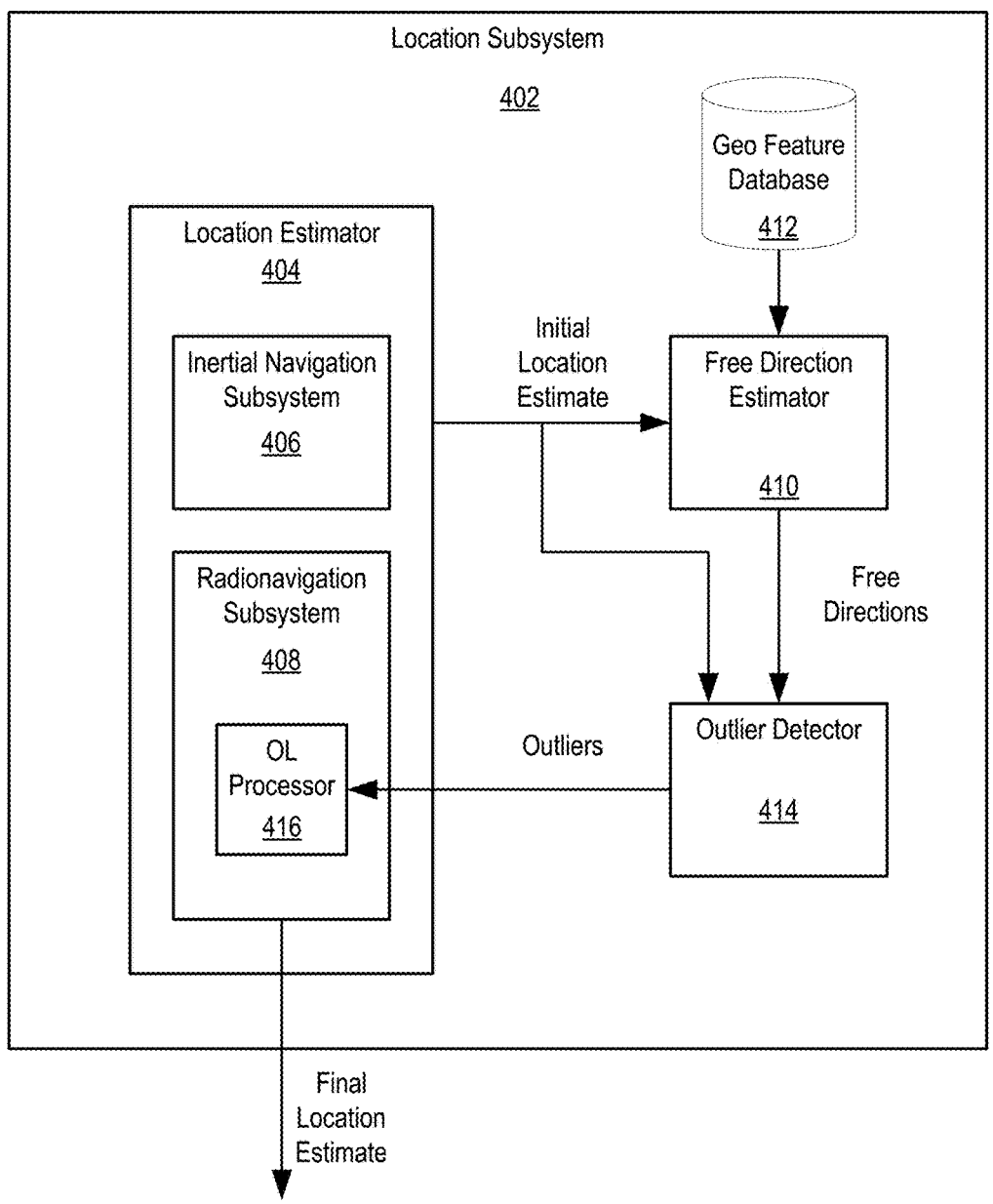
FIG. 4 is a block diagram illustrating components of an example location subsystem configured to perform azimuthal de-weighting of outlier signals.

FIG. 4 is a block diagram illustrating components of an example location subsystem 402 configured to perform azimuthal de-weight of outlier signals. Location subsystem 402 can be a component of mobile device 102 (of FIG. 1). Each component of location subsystem 402 can include one or more processors configured to perform various functions.

Location subsystem 402 can include location estimator 404. Location estimator 404 is a component of location subsystem 402 configured to determine the first location estimate of mobile device 102. In some implementations, location subsystem 402 can include, for example, inertial navigation subsystem 406 and radionavigation subsystem 408. Inertial navigation subsystem 406 is configured to determine first location estimate using inertial navigation techniques, e.g., dead reckoning, using readings from one or more accelerometers and a compass. Radionavigation subsystem 408 is configured to determine first location estimate using RF signals, including, for example, Wi-Fi signals, cellular signals, or GNSS signals.

Location estimator 404 can also determine a motion state of mobile device 102. The motion state can include whether mobile device 102 is moving or is stationary. If moving, the motion state can include a direction of movement. In some implementations, the motion state can include a device orientation, an antenna orientation, or both. Location estimator 404 can associate the motion state with the first location estimate, and provide the motion state and the first location estimate to free direction estimator 410.

Free direction estimator 410 is a component of location subsystem 402 configured to determine a free direction from the initial location estimate, and optionally, also from the motion state. Free direction estimator 410 can determine one or more free directions based on data from geographic feature database 412. The data can include 3D building data, terrain data or other data that identifies and describes interfering surfaces. Geographic feature database 412 can be a data store local to (e.g., onboard) mobile device 102, or a data store located remotely, at a server. Free direction estimator 410 can fetch the data using a query by the first location estimate and optionally, by the motion state including moving direction. The free directions can include an azimuth, a width, and optionally an elevation. If no elevation is given, the free directions can have a default elevation of 90 degrees. In some implementations, free direction estimator 410 can determine a likely angle of arrival of outlier signals using the device orientation, antenna orientation, or both. For example, free direction estimator 410 can determine that a particular azimuth and elevation correspond to an angle of arrival of RF signals, where reception of the RF signals can be affected by the characteristics of mobile device 102. For example, a directional gain (or loss) effect of an antenna or an antenna phase center variation can affect the reception of RF signals coming from a particular angle of an orientation. Free direction estimator 410 can designate this azimuth and elevation as a free direction. Free direction estimator 410 can provide the free directions to outlier detector 414.

Outlier detector 414 is a component of location subsystem 402 configured to receive the initial location estimate and the free directions, and determine one or more signal sources in the free directions of the initial location estimate. Outlier detector 414 can determine the one or more signal sources based on a constellation of the signal sources, including locations of the signal sources (e.g., GNSS satellite locations). Outlier detector 414 can transform a reference frame of the signal sources and determine, from the viewpoint of the initial location estimate, which of the signal sources are in the free direction. Outlier detector 414 can make the determination based on a cone having a vertex at the initial location estimate and a width along an azimuth of a free direction. Outlier detector 414 can designate the signal sources in the free direction as potential outliers. Outlier detector 414 can provide the one or more detected potential outliers to radionavigation subsystem 408 for further processing.

Radionavigation subsystem 408 can include outlier processor 416. Outlier processor 416 is configured to receive potential outliers detected by outlier detector 414, and de-weight RF signals from the potential outliers in a final location estimation, including removing these signals from the final location estimation. Additional details of de-weighting outliers are discussed above in reference to FIG. 2. Radionavigation subsystem 408 can provide the final location estimate to another component of mobile device 102, e.g., as an input to a location-based application program, or for presentation on a user interface (e.g., a display device or an audio device) to a user.

Example Procedures

Figure 5:
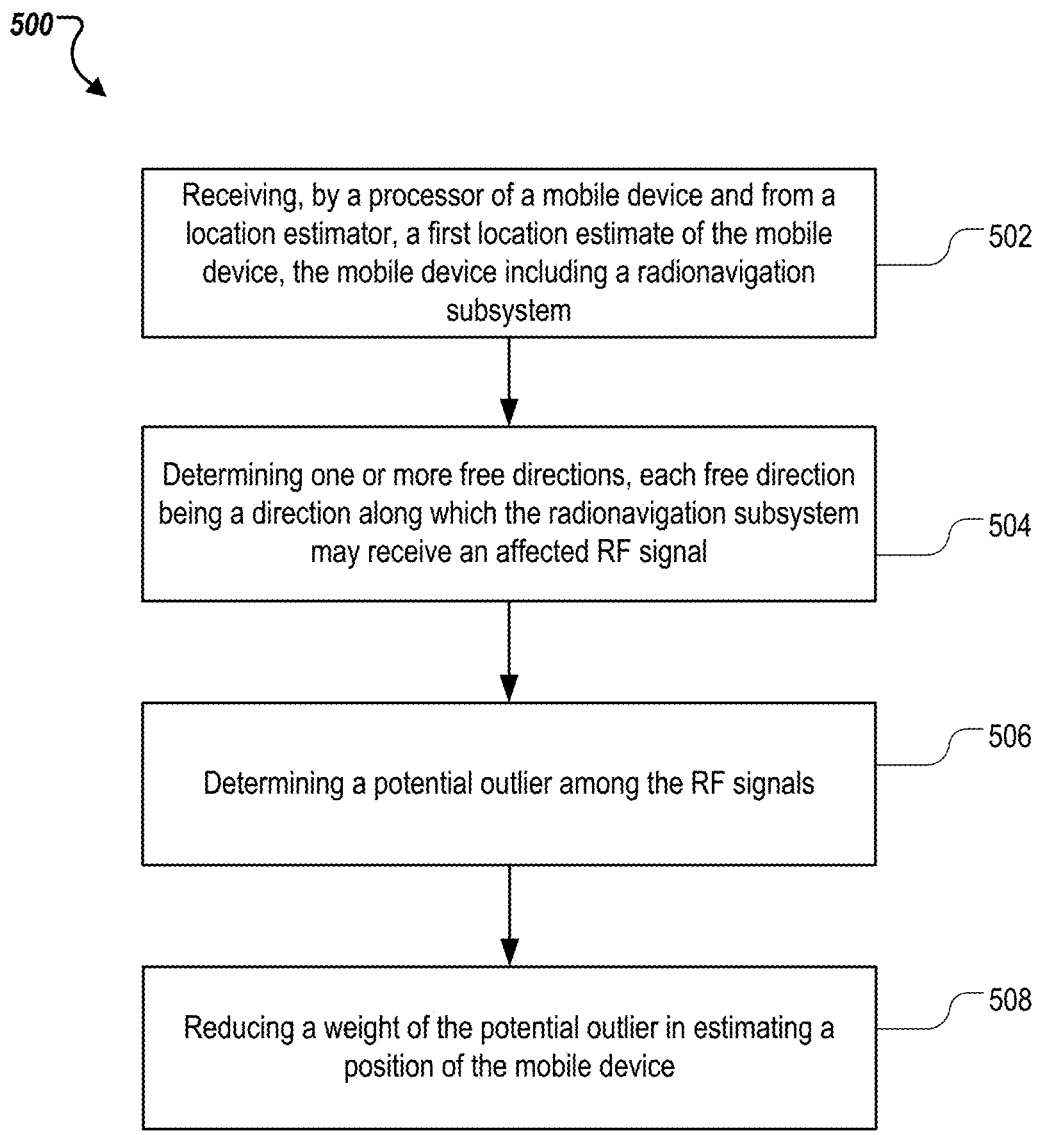
FIG. 5 is a flowchart of an example process of azimuthal de-weighting of outlier signals.

FIG. 5 is a flowchart of an example process 500 of azimuthal de-weighting of outlier signals. Process 500 can be performed by mobile device 102 (of FIG. 1).

Mobile device 102 can receive (502), from location estimator 404 (of FIG. 4), a first location estimate of mobile device 102. Mobile device 102 can include radionavigation subsystem 408 (of FIG. 4) configured to estimate a location of mobile device 102 using RF signals. Mobile device 102 can include other location subsystems for determining the first location estimate. In some implementations, radionavigation subsystem 408 can be configured to estimate a position of mobile device 102 using GNSS signals and using additional information on adjusting weights of at least a portion of the GNSS signals.

In some implementations, radionavigation subsystem 408 can include an indoor location subsystem configured to estimate the final location of mobile device 102 in an indoor environment using the RF signals. The RF signals being received by the indoor location subsystem can be transmitted from one or more wireless access points.

Mobile device 102 can determine (504) one or more free directions. Each free direction can be a direction along which radionavigation subsystem 408 receives or may receive an affected RF signal, and along which a distance between the first location estimate and an interfering surface that reflects or may reflect the RF signal is at least a threshold distance. The threshold distance can be a pre-specified distance or a distance corresponding to an environment. At or above the threshold distance to mobile device 102, an interfering surface may alter signal properties sufficient to cause at least a given level of positioning error.

In some implementations, determining the one or more free directions can be based on a moving direction of mobile device 102. Mobile device 102 can determine a moving direction of mobile device using the location estimator. Mobile device 102 can determine a reflection surface along the travel direction from geographic feature data, e.g., 3D building models or terrain data. The geographic feature data can include locations and heights of geographic features that are located sufficiently close to the first location estimate to interfere with signals received by the radionavigation subsystem. The reflection surface can be a surface of a geographic feature represented in the geographic feature data. Upon determining that a distance between the reflection surface and the first location estimate satisfies the threshold distance, mobile device 102 can designate the travel direction as a free direction.

In some implementations, determining the free direction can include determining an orientation of an antenna of mobile device 102 relative to inbound RF signals. Mobile device 102 can determine that the inbound RF signals, if coming from a given direction, will be affected by at least one of a signal gain at the orientation or an antenna phase center variation at the orientation. Mobile device 102 can designate the direction as the free direction.

In addition, in some implementations, mobile device 102 can designate a direction that is opposite to the moving direction as another free direction. In some implementations, determining the one or more free directions can include determining one or more cones based on the first location estimate and geographic feature data. Each cone having a vertex located at the first location estimate and an azimuth corresponding to a free direction.

Mobile device 102 can determine (506) a potential outlier among the RF signals. The potential outlier can be an RF signal among the RF signals that may cause a positioning error that is larger than positioning errors caused by one or more other RF signals of the RF signals. Determining the potential outlier can include designating a signal originated from a signal source located in an azimuth of at least one free direction from the first location estimate as the potential outlier. In some scenarios, a processor of mobile device 102 can designate a majority of GNSS signals that are received by the GNSS receiver as potential outliers.

Mobile device 102 can reduce (508) a weight of the potential outlier in estimating a position of mobile device 102. For example, mobile device 102 can provide an instruction to radionavigation subsystem 408 indicating that a weight of the potential outlier shall be reduced when estimating a final position of the mobile device using the RF signals. Radionavigation subsystem 408, e.g., the GNSS receiver, can reduce a respective weight of each of the potential outliers when estimating the final position, even when the potential outliers out number other signals. Indicating to radionavigation subsystem 408 that the weight of the outlier should be reduced can include instructing radionavigation subsystem 408 to reject the outlier in a location estimate.

Exemplary Mobile Device Architecture

Figure 6:
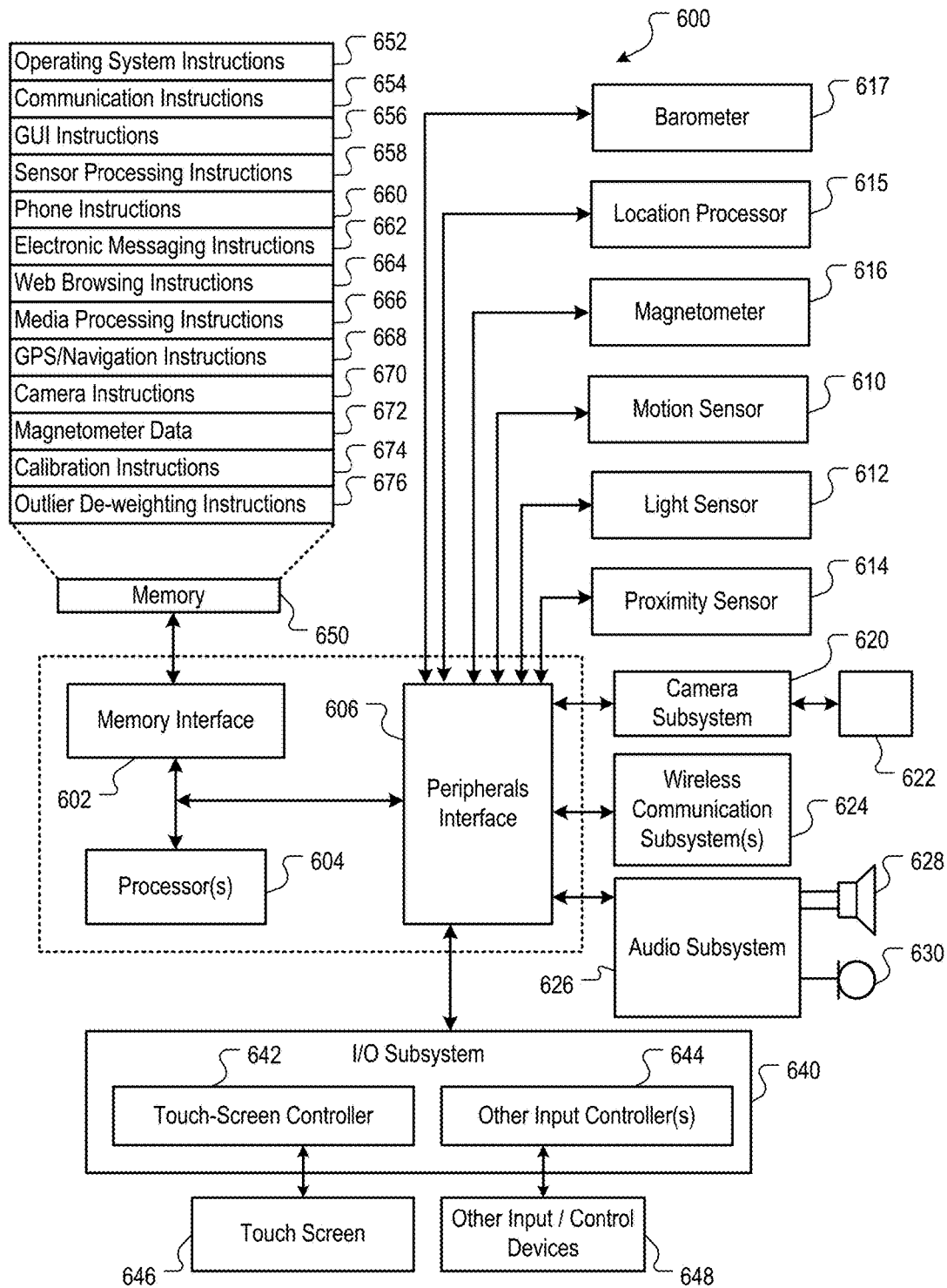
FIG. 6 is a block diagram illustrating an example device architecture of a mobile device implementing the features and operations described in reference to FIGS. 1-5.

FIG. 6 is a block diagram illustrating an exemplary device architecture 600 of a mobile device implementing the features and operations described in reference to FIGS. 1-5. A mobile device, e.g., mobile device 102, can include memory interface 602, one or more data processors, image processors and/or processors 604 and peripherals interface 606. Memory interface 602, one or more processors 604 and/or peripherals interface 606 can be separate components or can be integrated in one or more integrated circuits. Processors 604 can include application processors, baseband processors and wireless processors. The various components in the mobile device 102, for example, can be coupled by one or more communication buses or signal lines.

Sensors, devices and subsystems can be coupled to peripherals interface 606 to facilitate multiple functionalities. For example, motion sensor 610, light sensor 612 and proximity sensor 614 can be coupled to peripherals interface 606 to facilitate orientation, lighting and proximity functions of the mobile device 102. Location processor 615 can be connected to peripherals interface 606 to provide geopositioning. In some implementations, location processor 615 can be program to perform the operations of radionavigation subsystem 408. Electronic magnetometer 616 (e.g., an integrated circuit chip) can also be connected to peripherals interface 606 to provide data that can be used to determine the direction of magnetic North. Thus, electronic magnetometer 616 can be used as an electronic compass. Motion sensor 610 can include one or more accelerometers configured to determine change of speed and direction of movement of the mobile device 102. Barometer 617 can include one or more devices connected to peripherals interface 606 and configured to measure pressure of atmosphere around the mobile device 102.

Camera subsystem 620 and an optical sensor 622, e.g., a charged coupled device (CCD) or a complementary metal-oxide semiconductor (CMOS) optical sensor, can be utilized to facilitate camera functions, such as recording photographs and video clips.

Communication functions can be facilitated through one or more wireless communication subsystems 624, which can include radio frequency receivers and transmitters and/or optical (e.g., infrared) receivers and transmitters. The specific design and implementation of the communication subsystem 624 can depend on the communication network(s) over which a mobile device 102 is intended to operate. For example, a mobile device 102 can include communication subsystems 624 designed to operate over a GSM network, a GPRS network, an EDGE network, a Wi-Fi™ or WiMax™ network and a Bluetooth™ network. In particular, the wireless communication subsystems 624 can include hosting protocols such that the mobile device 102 can be configured as a base station for other wireless devices.

Audio subsystem 626 can be coupled to a speaker 628 and a microphone 630 to facilitate voice-enabled functions, such as voice recognition, voice replication, digital recording and telephony functions. Audio subsystem 626 can be configured to receive voice commands from the user.

I/O subsystem 640 can include touch surface controller 642 and/or other input controller(s) 644. Touch surface controller 642 can be coupled to a touch surface 646 or pad. Touch surface 646 and touch surface controller 642 can, for example, detect contact and movement or break thereof using any of a plurality of touch sensitivity technologies, including but not limited to capacitive, resistive, infrared and surface acoustic wave technologies, as well as other proximity sensor arrays or other elements for determining one or more points of contact with touch surface 646. Touch surface 646 can include, for example, a touch screen.

Other input controller(s) 644 can be coupled to other input/control devices 648, such as one or more buttons, rocker switches, thumb-wheel, infrared port, USB port and/or a pointer device such as a stylus. The one or more buttons (not shown) can include an up/down button for volume control of speaker 628 and/or microphone 630.

In one implementation, a pressing of the button for a first duration may disengage a lock of the touch surface 646; and a pressing of the button for a second duration that is longer than the first duration may turn power to the mobile device 102 on or off. The user may be able to customize a functionality of one or more of the buttons. The touch surface 646 can, for example, also be used to implement virtual or soft buttons and/or a keyboard.

In some implementations, the mobile device 102 can present recorded audio and/or video files, such as MP3, AAC and MPEG files. In some implementations, the mobile device 102 can include the functionality of an MP3 player. Other input/output and control devices can also be used.

Memory interface 602 can be coupled to memory 650. Memory 650 can include high-speed random access memory and/or non-volatile memory, such as one or more magnetic disk storage devices, one or more optical storage devices and/or flash memory (e.g., NAND, NOR). Memory 650 can store operating system 652, such as iOS, Darwin, RTXC, LINUX, UNIX, OS X, WINDOWS, or an embedded operating system such as VxWorks. Operating system 652 may include instructions for handling basic system services and for performing hardware dependent tasks. In some implementations, operating system 652 can include a kernel (e.g., UNIX kernel).

Memory 650 may also store communication instructions 654 to facilitate communicating with one or more additional devices, one or more computers and/or one or more servers. Memory 650 may include graphical user interface instructions 656 to facilitate graphic user interface processing; sensor processing instructions 658 to facilitate sensor-related processing and functions; phone instructions 660 to facilitate phone-related processes and functions; electronic messaging instructions 662 to facilitate electronic-messaging related processes and functions; web browsing instructions 664 to facilitate web browsing-related processes and functions; media processing instructions 666 to facilitate media processing-related processes and functions; GNSS/Location instructions 668 to facilitate generic GNSS and location-related processes and functions; camera instructions 670 to facilitate camera-related processes and functions; magnetometer data 672 and calibration instructions 674 to facilitate magnetometer calibration. The memory 650 may also store other software instructions (not shown), such as security instructions, web video instructions to facilitate web video-related processes and functions and/or web shopping instructions to facilitate web shopping-related processes and functions. In some implementations, the media processing instructions 666 are divided into audio processing instructions and video processing instructions to facilitate audio processing-related processes and functions and video processing-related processes and functions, respectively. An activation record and International Mobile Equipment Identity (IMEI) or similar hardware identifier can also be stored in memory 650. Memory 650 can store azimuthal de-weighting instructions 676 that, when executed by processor 604, can cause processor 604 to perform operations of azimuthal de-weighting of outlier signals. The operations can include the operations described above in various examples in reference to various figures, e.g., process 500 of FIG. 5.

Each of the above identified instructions and applications can correspond to a set of instructions for performing one or more functions described above. These instructions need not be implemented as separate software programs, procedures, or modules. Memory 650 can include additional instructions or fewer instructions. Furthermore, various functions of the mobile device 102 may be implemented in hardware and/or in software, including in one or more signal processing and/or application specific integrated circuits.

Figure 7:
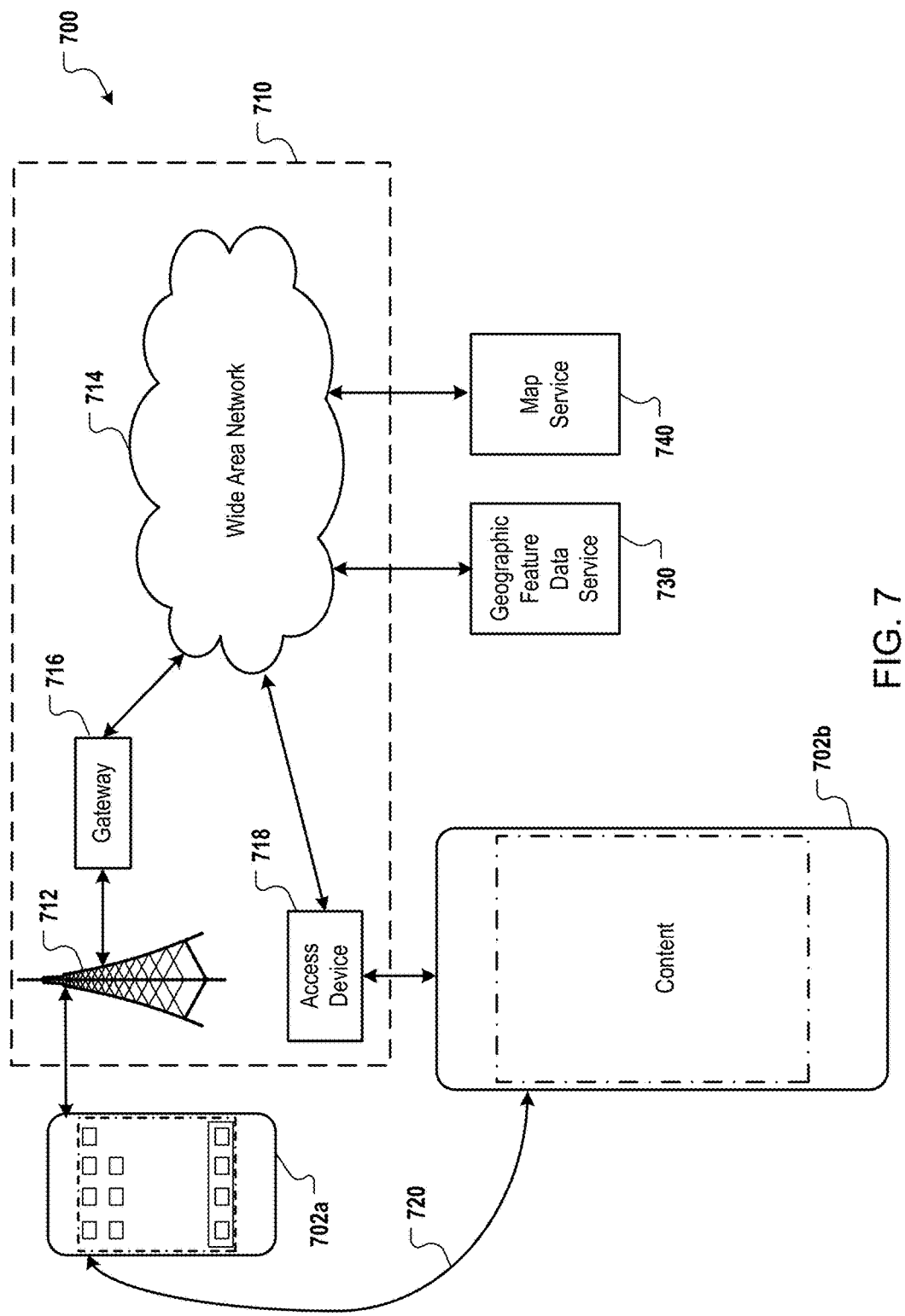
FIG. 7 is a block diagram of an example network operating environment for the mobile devices of FIGS. 1-5.

FIG. 7 is a block diagram of an example network operating environment 700 for the mobile devices of FIGS. 1-5. Mobile devices 702a and 702b can, for example, communicate over one or more wired and/or wireless networks 710 in data communication. For example, a wireless network 712, e.g., a cellular network, can communicate with a wide area network (WAN) 714, such as the Internet, by use of a gateway 716. Likewise, an access device 718, such as an 802.11g wireless access point, can provide communication access to the wide area network 714. Each of mobile devices 702a and 702b can be mobile device 102.

In some implementations, both voice and data communications can be established over wireless network 712 and the access device 718. For example, mobile device 702a can place and receive phone calls (e.g., using voice over Internet Protocol (VoIP) protocols), send and receive e-mail messages (e.g., using Post Office Protocol 3 (POP3)), and retrieve electronic documents and/or streams, such as web pages, photographs, and videos, over wireless network 712, gateway 716, and wide area network 714 (e.g., using Transmission Control Protocol/Internet Protocol (TCP/IP) or User Datagram Protocol (UDP)). Likewise, in some implementations, the mobile device 702b can place and receive phone calls, send and receive e-mail messages, and retrieve electronic documents over the access device 718 and the wide area network 714. In some implementations, mobile device 702a or 702b can be physically connected to the access device 718 using one or more cables and the access device 718 can be a personal computer. In this configuration, mobile device 702a or 702b can be referred to as a "tethered" device.

Mobile devices 702a and 702b can also establish communications by other means. For example, wireless device 702a can communicate with other wireless devices, e.g., other mobile devices, cell phones, etc., over the wireless network 712. Likewise, mobile devices 702a and 702b can establish peer-to-peer communications 720, e.g., a personal area network, by use of one or more communication subsystems, such as the Bluetooth™ communication devices. Other communication protocols and topologies can also be implemented.

The mobile device 702a or 702b can, for example, communicate with one or more services 730 and 740 over the one or more wired and/or wireless networks. For example, one or more geographic feature data services 730 can provide geographic feature data including 3D building models, terrain maps, and indoor floor plans to mobile devices 702a and 702b. Map service 740 provides virtual maps to mobile devices 702a and 702b for displaying estimated locations, e.g., the final estimated location.

Mobile device 702a or 702b can also access other data and content over the one or more wired and/or wireless networks. For example, content publishers, such as news sites, Really Simple Syndication (RSS) feeds, web sites, blogs, social networking sites, developer networks, etc., can be accessed by mobile device 702a or 702b. Such access can be provided by invocation of a web browsing function or application (e.g., a browser) in response to a user touching, for example, a Web object.

A system of one or more computers can be configured to perform particular actions by virtue of having software, firmware, hardware, or a combination of them installed on the system that in operation causes or cause the system to perform the actions. One or more computer programs can be configured to perform particular actions by virtue of including instructions that, when executed by data processing apparatus, cause the apparatus to perform the actions.

While this specification contains many specific implementation details, these should not be construed as limitations on the scope of any inventions or of what may be claimed, but rather as descriptions of features specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the subject matter have been described. Other embodiments are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

A number of implementations of the invention have been described. Nevertheless, it will be understood that various modifications can be made without departing from the spirit and scope of the invention.

What is claimed is:

1. A method comprising:
   obtaining, by a mobile device, a first location estimate of the mobile device, the mobile device including a radionavigation subsystem configured to estimate a second location of the mobile device using radio frequency (RF) signals;
   determining a free direction from which the radionavigation subsystem receives a particular RF signal of the RF signals that is affected by an interfering surface;
   determining a distance between the first location estimate and the interfering surface along the free direction;
   comparing the distance with a threshold distance;
   based on the distance being at least the threshold distance, designating the particular RF signal as a potential outlier RF signal; and reducing a weight of the potential outlier RF signal in determining, by the radionavigation subsystem, the second location estimate of the mobile device using the RF signals.

2. The method of claim 1, wherein:
the radionavigation subsystem of the mobile device includes a global navigation satellite system (GNSS) receiver configured to determine the second location estimate using GNSS signals and using additional information on adjusting weights of at least a portion of the GNSS signals,
the mobile device designates a plurality of GNSS signals that are received by the GNSS receiver as potential outlier RF signals, and
the GNSS receiver reduces a respective weight of each of the potential outlier RF signals in determining the second location estimate.

3. The method of claim 1, wherein the radionavigation subsystem includes an indoor location subsystem configured to determine the second location estimate of the mobile device in an indoor environment using the RF signals, the RF signals being received by the indoor location subsystem from one or more wireless access points.

4. The method of claim 1, wherein determining the free direction comprises:
determining a moving direction of the mobile device using the location estimator;
determining the interfering surface along the moving direction from geographic feature data, the geographic feature data including locations and heights of geographic features that are located sufficiently close to the first location estimate to interfere with signals received by the radionavigation subsystem, the interfering surface being a surface of a geographic feature represented in the geographic feature data; and
upon determining that a distance between the interfering surface and the first location estimate satisfies the threshold distance, designating the moving direction as the free direction.

5. The method of claim 1, wherein determining the free direction comprises:
determining an orientation of an antenna of the mobile device relative to inbound RF signals;
determining that the inbound RF signals, if coming from a given direction, will be affected by at least one of a signal gain at the orientation or an antenna phase center variation at the orientation; and
designating the direction as the free direction.

6. The method of claim 1, wherein determining the free direction comprises:
determining a cone based on the first location estimate and geographic feature data, each cone having a vertex located at the first location estimate and an azimuth corresponding to the free direction.

7. The method of claim 1, wherein reducing the weight of the potential outlier RF signals comprises instructing the radionavigation subsystem to reject the potential outlier RF signals in estimating a position, velocity and time (PVT) solution.

8. A mobile device comprising:
a radionavigation subsystem configured to estimate a location of the mobile device using radio frequency (RF) signals;
one or more processors; and
a non-transitory computer-readable medium storing instructions that, when executed by the one or more processors, cause the one or more processors to perform operations comprising:
obtaining a first location estimate of the mobile device from the radionavigation subsystem;
determining a free direction from which the radionavigation subsystem receives a particular RF signal of the RF signals that is affected by an interfering surface;
determining a distance between the first location estimate and the interfering surface along the free direction;
comparing the distance with a threshold distance;
based on the distance being at least the threshold distance, designating the particular RF signal as a potential outlier RF signal; and
reducing a weight of the potential outlier RF signal in determining, by the radionavigation subsystem, a second location estimate of the mobile device using the RF signals.

9. The mobile device of claim 8, wherein:
the radionavigation subsystem of the mobile device includes a global navigation satellite system (GNSS) receiver configured to determine the second location estimate using GNSS signals and using additional information on adjusting weights of at least a portion of the GNSS signals,
the mobile device designates a plurality of GNSS signals that are received by the GNSS receiver as potential outlier RF signals, and
the GNSS receiver reduces a respective weight of each of the potential outlier RF signals in determining the second location estimate.

10. The mobile device of claim 8, wherein the radionavigation subsystem includes an indoor location subsystem configured to determine the second location estimate of the mobile device in an indoor environment using the RF signals, the RF signals being received by the indoor location subsystem from one or more wireless access points.

11. The mobile device of claim 8, wherein determining the free direction comprises:
determining a moving direction of the mobile device using the location estimator;
determining the reflection surface along the moving direction from geographic feature data, the geographic feature data including locations and heights of geographic features that are located sufficiently close to the first location estimate to interfere with signals received by the radionavigation subsystem, the interfering surface being a surface of a geographic feature represented in the geographic feature data; and
upon determining that a distance between the interfering surface and the first location estimate satisfies the threshold distance, designating the moving direction as the free direction.

12. The mobile device of claim 11, the operations comprising designating a direction that is opposite to the moving direction as another free direction.

13. The mobile device of claim 8, wherein determining the free direction comprises:
determining a cone based on the first location estimate and geographic feature data, each cone having a vertex located at the first location estimate and an azimuth corresponding to the free direction.

14. The mobile device of claim 8, wherein reducing the weight of the potential outlier RF signals comprises instructing the radionavigation subsystem to reject the potential outlier RF signals in a position, velocity and time (PVT) calculation.

15. A non-transitory computer-readable medium storing instructions that, when executed by one or more processors, cause the one or more processors to perform operations comprising:
   obtaining by a mobile device, a first location estimate of the mobile device, the mobile device including a radionavigation subsystem configured to estimate a second location of the mobile device using radio frequency (RF) signals;
   determining a free direction from which the radionavigation subsystem receives a particular RF signal of the RF signals that is affected by an interfering surface;
   determining a distance between the first location estimate and the interfering surface along the free direction;
   comparing the distance with a threshold distance;
   based on the distance being at least the threshold distance, designating the particular RF signal as a potential outlier RF signal; and
   reducing a weight of the potential outlier RF signal in determining, by the radionavigation subsystem, the second location estimate of the mobile device using the RF signals.

16. The non-transitory computer-readable medium of claim 15, wherein:
   the radionavigation subsystem of the mobile device includes a global navigation satellite system (GNSS) receiver configured to determine the second location estimate using GNSS signals and using additional information on adjusting weights of at least a portion of the GNSS signals,
   the mobile device designates a plurality of GNSS signals that are received by the GNSS receiver as potential outlier RF signals, and
   the GNSS receiver reduces a respective weight of each of the potential outlier RF signals in determining the second location estimate.

17. The non-transitory computer-readable medium of claim 15, wherein the radionavigation subsystem includes an indoor location subsystem configured to determine the second location estimate of the mobile device in an indoor environment using the RF signals, the RF signals being received by the indoor location subsystem from one or more wireless access points.

18. The non-transitory computer-readable medium of claim 15, wherein determining the free direction comprises:
   determining a moving direction of the mobile device using the location estimator;
   determining the interfering surface along the moving direction from geographic feature data, the geographic feature data including locations and heights of geographic features that are located sufficiently close to the first location estimate to interfere with signals received by the radionavigation subsystem, the interfering surface being a surface of a geographic feature represented in the geographic feature data; and
   upon determining that a distance between the reflection surface and the first location estimate satisfies the threshold distance, designating the moving direction as the free direction.

19. The non-transitory computer-readable medium of claim 18, the operations comprising designating a direction that is opposite to the moving direction as another free direction.

20. The non-transitory computer-readable medium of claim 15, wherein reducing the weight of the potential outlier RF signals comprises instructing the radionavigation subsystem to reject the potential outlier RF signals in a position, velocity and time (PVT) calculation.

* * * * *

UNITED STATES PATENT AND TRADEMARK OFFICE
CERTIFICATE OF CORRECTION

PATENT NO. : 9,817,102 B1  
APPLICATION NO. : 15/179889  
DATED : November 14, 2017  
INVENTOR(S) : Isaac Thomas Miller, Glenn Donald MacGougan and Kumar Gaurav Chhokra Page 1 of 1

It is certified that error appears in the above-identified patent and that said Letters Patent is hereby corrected as shown below:

In the Claims

Column 17, Line 8, Claim 15, replace "obtaining" with -- obtaining, --.

Signed and Sealed this  
Sixth Day of February, 2018

Joseph Matal  
*Performing the Functions and Duties of the  
Under Secretary of Commerce for Intellectual Property and  
Director of the United States Patent and Trademark Office*